Dec. 22, 1936.   H. D. BRUBAKER   2,065,424
EDUCATIONAL DEVICE
Filed Oct. 22, 1935
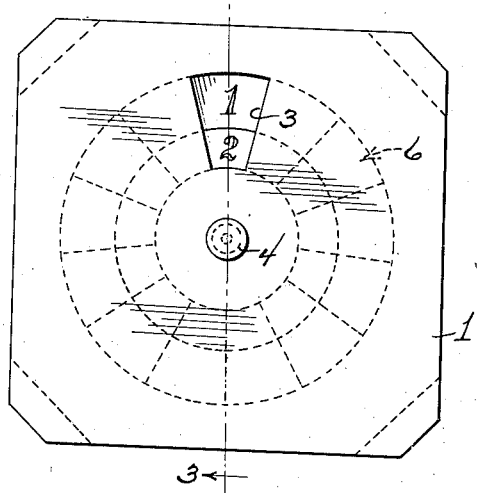
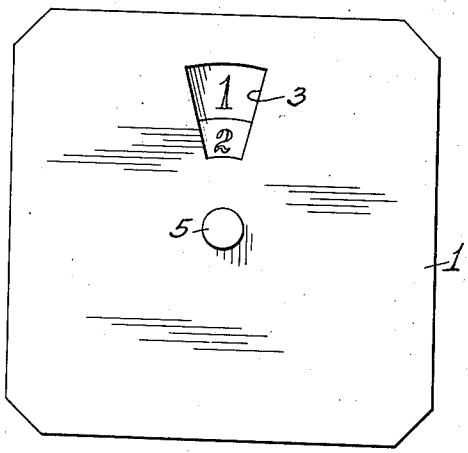
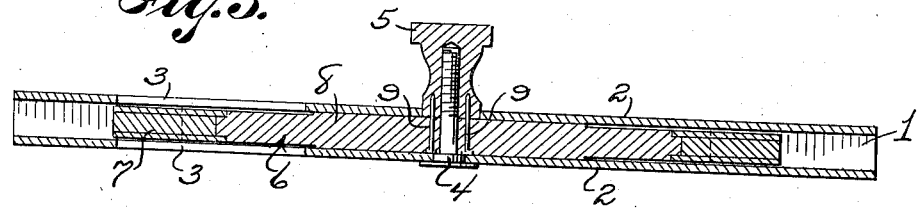
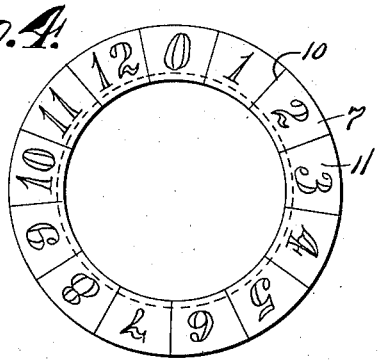
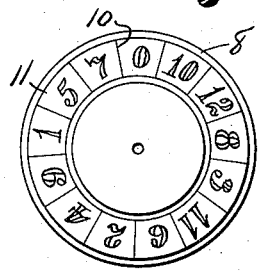
Howard D. Brubaker
INVENTOR
BY Victor J. Evans & Co.
ATTORNEY Patented Dec. 22, 1936

2,065,424

UNITED STATES PATENT OFFICE 2,065,424

EDUCATIONAL DEVICE

Howard D. Brubaker, Wilcox, Pa.

Application October 22, 1935, Serial No. 46,181

1 Claim. (Cl. 35—74)

This invention relates to educational devices, and has for the primary object the provision of a simple and practical device of the above stated character which may be employed by teachers, instructors or parents or anyone for clearly and simply showing or demonstrating to children combination of figures, either for subtraction, multiplication or addition problems so that the children will visualize and be thoroughly impressed with answers or results to the problems, and further may be employed for oral drills in addition, subtraction, division and multiplication.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a plan view illustrating one side of an educational device.

Figure 2 is a similar view showing the opposite side of the educational device.

Figure 3 is a sectional view taken on the line 3—3 of Figure 1.

Figure 4 is a plan view showing one of the numeral bearing elements.

Figure 5 is a similar view to Figure 4, showing the other numeral bearing member.

Referring in detail to the drawing, the numeral 1 indicates a substantially rectangular shaped casing or housing including opposed side walls 2 suitably spaced and joined together and each is provided with a window or opening 3. A headed bolt 4 is journaled to the walls 2 and has threaded thereto a finger piece 5. A numeral bearing rotor 6 is mounted to rotate between the walls 2 and includes annular sections 7 and 8. The section 8 fits within the section 7. The inner periphery of the section 7 is grooved to receive the reduced outer periphery of the section 8 whereby the sections are rotatably connected with one another and with sufficient friction that the section 7 may rotate with the section 8 when free of frictional contact with the walls 2. The section 8 is mounted on the bolt 4 and is secured to the finger piece by fasteners 9. The sections 7 and 8 have arranged thereon radially disposed lines 10 defining spaces 11 therebetween and applied to the sections 7 and 8 within the spaces 11 are numbers ranging from zero to 12 or any other combination of numbers which may be selected. The numbers on the section 7 are consecutively arranged while the numbers on the section 8 are non-consecutively arranged. The walls 2 of the casing are capable of a limited flexation and may be brought, when pressure is applied thereto, to bear against the section 7 for holding said section against rotation during the rotation of the section 8 by the finger piece 5. The path of movement of the numbers is such that any one of the numbers of the sections 7 and 8 may be brought to view through the windows 3. To change the numbers of the sections 7 relative to the windows, said section 7 is rotated by the section 8 through the manual rotation of the finger piece 5. However, when it is desired to change the numerals or numbers of the section 8 relative to the section 7 when appearing through the window, the walls 2 are flexed to bear against the section 7, thereby holding the same against rotation during the rotation of the section 8.

Having described the invention, I claim:

An educational device comprising a casing including opposite flexible side walls each having a window, a rotor journaled between said walls and including relatively movable annular sections, one grooved to frictionally receive the other whereby one section may be rotated while the other section is held stationary by the flexing of the walls thereagainst, said annular sections bearing numerals any of which may be brought into view through the windows, and a finger piece secured to one of the sections.

HOWARD D. BRUBAKER.